(12) United States Patent
Yang

(10) Patent No.: US 9,790,844 B2
(45) Date of Patent: Oct. 17, 2017

(54) INTAKE-AIR COOLING APPARATUS FOR VEHICLE

(71) Applicant: HYUNDAI MOTOR COMPANY, Seoul (KR)

(72) Inventor: Jae Sik Yang, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 209 days.

(21) Appl. No.: 14/730,157

(22) Filed: Jun. 3, 2015

(65) Prior Publication Data

US 2016/0146095 A1 May 26, 2016

(30) Foreign Application Priority Data

Nov. 20, 2014 (KR) ........................ 10-2014-0162826

(51) Int. Cl.
| | |
|---|---|
| *F02B 29/04* | (2006.01) |
| *F02M 31/20* | (2006.01) |
| *F01N 5/04* | (2006.01) |
| *F02M 31/00* | (2006.01) |

(52) U.S. Cl.
CPC ............ *F02B 29/0475* (2013.01); *F01N 5/04* (2013.01); *F02B 29/045* (2013.01); *F02B 29/0412* (2013.01); *F02M 31/005* (2013.01); *F02M 31/20* (2013.01); *Y02T 10/126* (2013.01); *Y02T 10/146* (2013.01); *Y02T 10/16* (2013.01)

(58) Field of Classification Search
CPC ................ F02B 29/0412; F02B 29/045; F02B 29/0475; F02M 31/005; F02M 31/20; F01N 5/04; Y02T 10/126; Y02T 10/146; Y02T 10/16
See application file for complete search history.

(56) References Cited

U.S. PATENT DOCUMENTS

| | | | |
|---|---|---|---|
| 5,547,019 A | 8/1996 | Iacullo | |
| 2003/0234008 A1* | 12/2003 | Van Winkle | F01P 9/00 123/559.1 |
| 2004/0025517 A1 | 2/2004 | Fong | |
| 2006/0260304 A1* | 11/2006 | Ishiwatari | F02B 37/10 60/599 |
| 2015/0214458 A1* | 7/2015 | Nandigama | F02B 29/0406 60/599 |

FOREIGN PATENT DOCUMENTS

| | | | |
|---|---|---|---|
| JP | 63-121765 U | | 8/1988 |
| JP | 2009-167857 A | | 7/2009 |
| JP | 2013076386 A | * | 4/2013 |
| KR | 10-1999-0040821 A | | 6/1999 |
| KR | 10-2002-0032474 A | | 5/2002 |
| KR | 10-2005-0071093 A | | 7/2005 |
| KR | 10-2014-0034953 A | | 3/2014 |

* cited by examiner

*Primary Examiner* — Audrey K Bradley
(74) *Attorney, Agent, or Firm* — McDermott Will & Emery LLP

(57) ABSTRACT

An intake-air cooling apparatus for a vehicle includes an intercooler of a turbocharger, and an intake line to which compressed air is supplied from the intercooler. A fluid moving unit is connected at a first side thereof to the intercooler and connected at a second side thereof to the intake line, cools indoor air via a Peltier element.

4 Claims, 3 Drawing Sheets

INTAKE-AIR COOLING APPARATUS FOR VEHICLE

CROSS REFERENCE TO RELATED APPLICATION

The present application claims the benefit of priority to Korean Patent Application No. 10-2014-0162826, filed on Nov. 20, 2014, the entire content of which is incorporated herein for all purposes by this reference.

TECHNICAL FIELD

The present disclosure relates to an intake-air cooling apparatus for a vehicle capable of lowering a temperature of intake air when compressed air is supplied from an intercooler to an intake line using an electric turbocharger.

BACKGROUND

A conventional turbocharger of a vehicle cools hot compressed air through an intercooler. The compressed air is supplied from the intercooler to an engine through an intake line without adjusting its temperature. However, when a temperature of outdoor air is high or a vehicle starts at a stop state, efficiency of the intercooler is deteriorated and thereby the temperature of the supplied air is increased.

Further, when the vehicle having the turbocharger starts in a state where the temperature of the intake air is high, excessive turbo lag may occur, and overall engine performance and fuel efficiency decrease.

Thus, launching performance of the vehicle having the conventional turbocharger varies depending on the temperature of the outdoor air, causing a driver to feel inconsistency in vehicle behavior and leading to a reduction in fuel efficiency in the case where the temperature of the outdoor air is high, i.e., in the summer.

Therefore, a need exits for an intake-air cooling apparatus for a vehicle, which can reduce the temperature of intake air supplied from the turbocharger to the intake line to increase launching performance of the vehicle and to improve fuel efficiency.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art. The present disclosure describes an intake-air cooling apparatus for a vehicle, which is capable of reducing temperature of intake air supplied from a turbocharger to an intake line to increase launching performance of the vehicle and improve fuel efficiency.

According to an embodiment of the present inventive concept, an intake-air cooling apparatus for a vehicle includes an intercooler of a turbocharger and an intake line to which compressed air is supplied from the intercooler. A fluid moving unit is connected at a first side thereof to the intercooler and connected at a second side thereof to the intake line. The fluid moving unit cools indoor air via a Peltier element.

The fluid moving unit may include the Peltier element and a heat pipe.

The fluid moving unit may include a cooling part disposed between the Peltier element and the heat pipe. A heat absorbing part of the Peltier element may be disposed in the cooling part, so that the heat pipe may be operated via the Peltier element to cool the indoor air.

The fluid moving unit may include a cooling part between the Peltier element and the heat pipe. A heat absorbing part of the Peltier element may be disposed in the cooling part. A duct, through which the indoor air flows, may be inserted into the heat pipe, such that the heat pipe may be operated via the Peltier element to cool the indoor air in the duct.

A heat insulation part may be disposed on an outermost portion of the fluid moving unit to prevent heat exchange between an inside and an outside of the fluid moving unit.

The turbocharger may be an electric turbocharger, and when the turbocharger is in an inoperative state, a motor may operate in a reverse direction by exhaust gas to charge a battery.

As is apparent from the above description, according to the intake-air cooling apparatus for a vehicle, an additional power source is unnecessary for supplying power to a Peltier element. Further, a battery is charged with electrical energy which is generated during a driving operation for generating power by using an electric turbocharger, and the Peltier element is operated using the power of the battery without negatively affecting the existing system.

Further, the temperature of the intake air supplied to the intake line is efficiently lowered by applying rapid heat conduction of the heat pipe and rapid cooling of the Peltier element. Accordingly, the intake air can be cooled and supplied to an engine regardless of the temperature of the outdoor air and a state of the vehicle, thus enhancing launching performance of a vehicle and allowing the engine to be driven with consistent performance, and thereby improving engine driving reliability, overall engine performance, and fuel efficiency.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Hereinbelow, an intake-air cooling apparatus for a vehicle according to an embodiment of the present inventive concept will be described with reference to the accompanying drawings.

Figure 1:
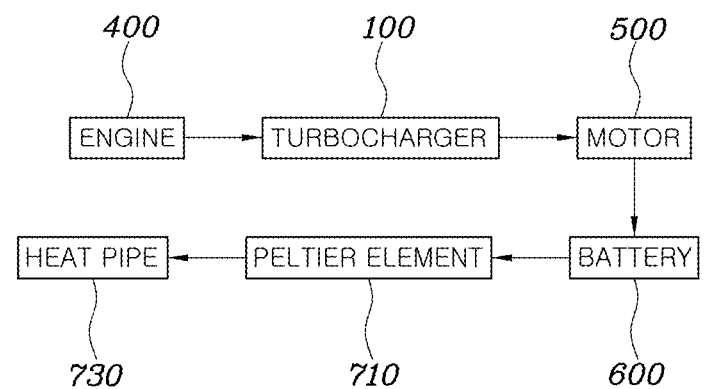
FIG. 1 shows a block diagram of an intake-air cooling apparatus for a vehicle according to an embodiment of the present inventive concept.
Figure 2:
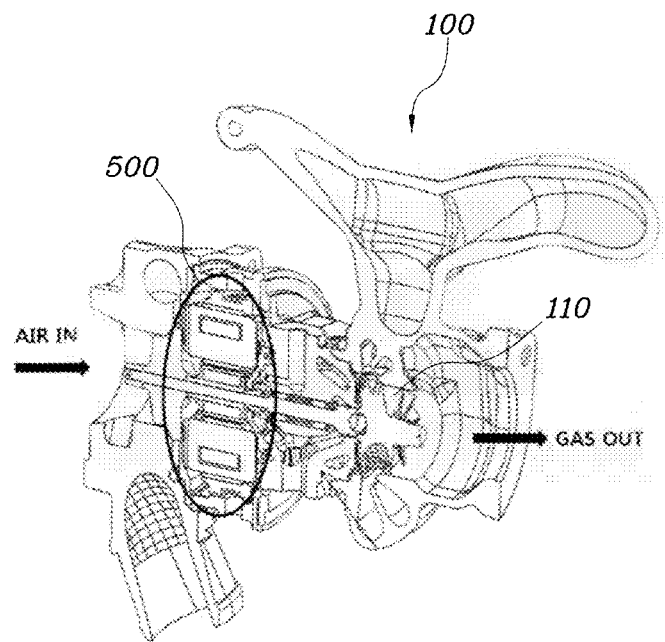
FIG. 2 shows a detailed view of a turbocharger and a motor.
Figure 3:
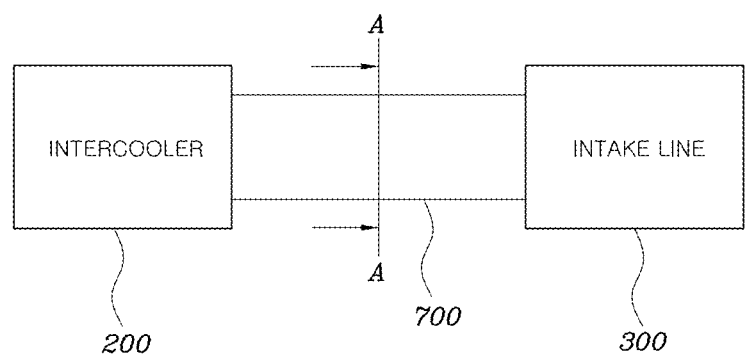
FIG. 3 shows a fluid moving unit of the present inventive concept.
Figure 4:
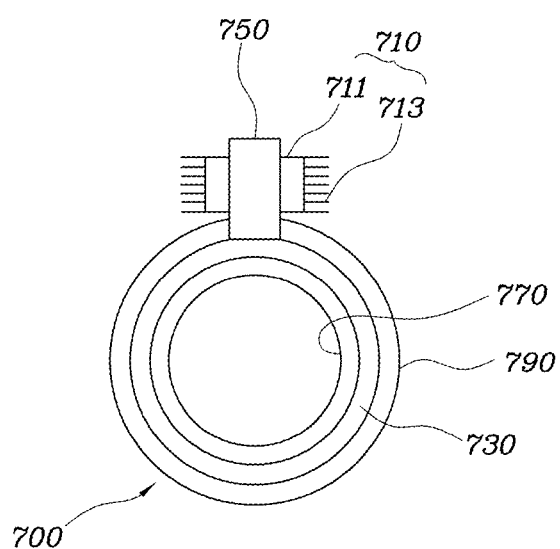
FIG. 4 shows a sectional view taken along the line A-A of FIG. 3.

FIG. 1 shows a block diagram of an intake-air cooling apparatus for a vehicle according to an embodiment of the present inventive concept. FIG. 2 shows a detailed view of a turbocharger and a motor. FIG. 3 shows a fluid moving unit of the present inventive concept. FIG. 4 shows a sectional view taken along the line A-A of FIG. 3.

An intake-air cooling apparatus for a vehicle according to an embodiment of the present inventive concept includes an intercooler 200 of a turbocharger 100 and an intake line 300 to which compressed air is supplied from the intercooler 200. A fluid moving unit 700 is connected at a first side thereof to the intercooler 200 and connected at a second side thereof to the intake line 300. The fluid moving unit 700 cools indoor air via a Peltier element 710.

As shown in FIG. 2, when an engine 400 of the vehicle is running, exhaust gas is continuously discharged, and the vehicle having the turbocharger 100 continuously discharges the exhaust gas through a turbine 110 of the turbocharger 100. Thus, energy of the exhaust gas discharged from the engine 400 used to operate the turbocharger 100, however, is discarded unless operational conditions are satisfied in which the turbocharger 100 is operated at an accelerated or constant speed to compress the intake air.

As shown in FIGS. 1 and 2, the electric turbocharger 100 is power-generated by supplying a reverse torque to a motor 500 which is rotated by the unnecessarily discarded exhaust gas (decelerated or constant speed condition). Thus, thermal energy of the exhaust gas is converted into kinetic energy of the turbocharger 100, and the kinetic energy of the turbocharger 100 is converted into electrical energy for operating the motor 500. A battery 600 is charged by driving the motor 500, and the energy of the charged battery 600 is used to operate the Peltier element 710.

As shown in FIG. 3, when the turbocharger 100 is operated, compressed air is supplied from the intercooler 200 to the intake line 300. The lower the temperature of air supplied to the intake line 300 is, the higher the engine performance and fuel efficiency are. However, according to the related art, since the compressed air supplied from the intercooler 200 to the intake line 300 has a high temperature, a turbo lag excessively occurs when the turbocharger 100 is driven.

Hence, according to the present disclosure, the fluid moving unit 700 including the Peltier element 710 and a heat pipe 730 is provided between the intercooler 200 and the intake line 300. The fluid moving unit 700 cools the air supplied to the intake line 300 using the Peltier element 710 and the heat pipe 730.

In detail, as shown in FIG. 4, the fluid moving unit 700 includes the Peltier element 710 and the heat pipe 730. A cooling part 750 is provided between the Peltier element 710 and the heat pipe 730, so that a heat absorbing part 711 of the Peltier element 710 is disposed in the cooling part 750. A duct 770 in which air may flow is inserted into the heat pipe 730, and the heat pipe 730 is operated via the Peltier element 710, thus cooling the air inside the duct 770. The cooled air is supplied to the intake line 300.

Figure 5:
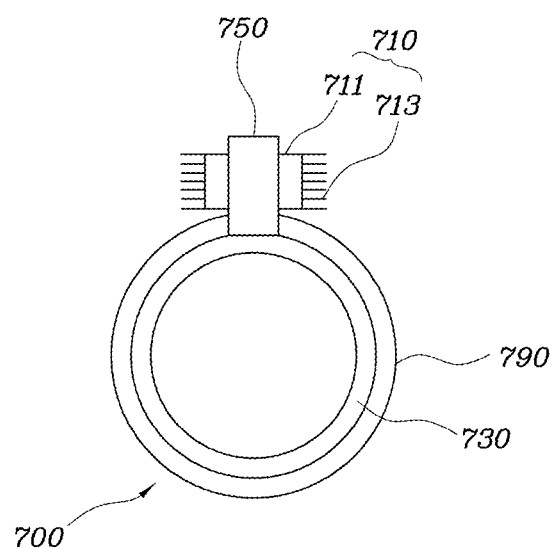
FIG. 5 shows a sectional view taken along the line A-A of FIG. 3 according to another embodiment of the present inventive concept.

FIG. 5 shows a sectional view taken along the line A-A of FIG. 3 according to another embodiment. As shown in FIG. 5, the fluid moving unit 700 includes the Peltier element 710 and the heat pipe 730 except the duct 770. The cooling part 750 is provided between the Peltier element 710 and the heat pipe 730, and the heat absorbing part 711 of the Peltier element 710 is positioned in the cooling part 750, so that the heat pipe 730 is operated via the Peltier element 710 and thereby the air can be cooled.

In addition, a heat insulation part 790 is provided on an outermost portion of the fluid moving unit 700, thus preventing heat exchange between an inside and an outside of the fluid moving unit 700 and thereby preventing the temperature from rising while the air cooled via the Peltier element 710, and the heat pipe 730 passes through the fluid moving unit 700.

That is, the compressed air cooled by the intercooler 200 of the electric turbocharger 100 passes through the duct 770 before entering the intake line 300. According to the present disclosure, a cooling structure using the Peltier element 710 is provided in the duct 770, and the fluid moving unit 700 is formed and operated as follows.

The duct 770 is surrounded with the heat pipe 730 that is cooled via the Peltier element 710, and the air cooled by the heat pipe 730 with the operation of the Peltier element 710 flows inside the duct 770. Further, the duct 770 may be eliminated, so that compressed air may pass directly through the heat pipe 730.

The Peltier element 710 may be operated by the power of the battery 600, and the heat absorbing part 711 operated by the operation of the Peltier element 710, so that the air in the heat pipe 730 is cooled through the cooling part 750. Since the compressed air cooled in the intercooler 200 has a relatively high temperature to be supplied to the intake line 300, heat transfer instantly occurs between the heat absorbing part 711 of the Peltier element 710 and the heat pipe 730, thus further cooling the compressed air.

The Peltier element 710 is composed of a heat absorbing part 711 for absorbing heat and a heat dissipating part 713 for dissipating heat. The heat absorbing part 711 is coupled to the cooling part 750 provided between the Peltier element 710 and the heat pipe 730, so that the heat pipe 730 is cooled by the heat absorbing part 711. The heat dissipating part 713 dissipates the heat to the atmosphere via a cooling fin. A plurality of Peltier elements 710 may be provided on the cooling part 750, and the heat absorbing part 711 may be coupled to the cooling part 750.

Even the compressed air cooled via the intercooler 200 is usually 40° C. or more. The present disclosure supplies the intake air to the intake line 300 at the temperature of 25° C. or less, thus increasing an output of the engine 400 and fuel efficiency.

The present disclosure provides the intake-air cooling apparatus for a vehicle having an electric turbocharger, thus obviating the necessity of using the additional power source so as to supply power to the Peltier element, unlike the related art. Further, the battery is charged with electrical energy generated during a driving operation for generating power, and the Peltier element is operated using the power of the battery.

Furthermore, the apparatus of the present disclosure uses rapid heat conduction performance of the heat pipe and rapid cooling performance of the Peltier element, so that the temperature of the intake air supplied to the intake line is efficiently lowered. Thus, the intake air is cooled and supplied to the engine regardless of temperature of the outdoor air and a state of the vehicle, thus enhancing launching performance of the vehicle and allowing the engine to be driven with constant performance, and thereby improving engine driving reliability and engine performance and fuel efficiency.

Although the exemplary embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. An intake-air cooling apparatus for a vehicle, comprising:
   an intercooler of a turbocharger;
   an intake line to which compressed air is supplied from the intercooler;
   a heat pipe connected at a first side thereof to the intercooler and connected at a second side thereof to the intake line; and
   a Peltier element attached to the heat pipe so that the heat pipe is operated to cool the compressed air via the Peltier element.

2. The intake-air cooling apparatus as set forth in claim 1, further comprising:
   a cooling block disposed between the Peltier element and the heat pipe; and
   a heat absorbing panel disposed inside the cooling block such that the heat pipe is operated via the Peltier element to cool the compressed air.

3. The intake-air cooling apparatus as set forth in claim 1, further comprising:
   a cooling block disposed between the Peltier element and the heat pipe;
   a heat absorbing panel disposed in the cooling block; and
   a duct, through which the compressed air flows, inserted into the heat pipe, such that the heat pipe is operated via the Peltier element to cool the compressed air in the duct.

4. The intake-air cooling apparatus as set forth in claim 1, further comprising:
   a heat insulation pipe disposed on an outermost portion of the heat pipe to prevent heat exchange between an inside and an outside of the heat pipe.

* * * * *